Dec. 9, 1930.  G. E. PICKUP  1,784,201

OVEN STRUCTURE FOR ELECTRIC RANGES

Filed Jan. 28, 1929

Inventor
George E. Pickup
By Chindahl, Parker & Carlson
Attys

Patented Dec. 9, 1930

1,784,201

UNITED STATES PATENT OFFICE

GEORGE E. PICKUP, OF NEWARK, OHIO, ASSIGNOR TO THE WEHRLE COMPANY, OF NEWARK, OHIO, A CORPORATION OF OHIO

OVEN STRUCTURE FOR ELECTRIC RANGES

Application filed January 28, 1929. Serial No. 335,399.

The invention relates generally to ranges and more particularly to an oven structure for an electric range.

Two major considerations involved in the design of electric ovens are thermal and volumetric efficiency, the two factors being inter-related in that low volumetric efficiency, even though accompanied by high thermal efficiency, will result in an excessive consumption of heat. Such a result occurs when the oven proper is made sufficiently large to house the heating units. In the ordinary oven design, for example, the oven bottom is constructed flush with the door opening, and the lower heating unit, together with a suitable insulating base, is supported directly on the oven bottom.

The heating unit when thus positioned detracts from the available space for cooking purposes with the result that the total volume of air to be heated is considerably in excess of the working volume of the oven. Conversely, if the heating unit is located externally of the oven proper it serves to increase the volumetric efficiency and availability of the structure but its thermal efficiency is lowered in proportion to the extent to which the heating element is removed from the space to be heated. Any attempts to increase the thermal efficiency, when the heating unit is located externally of the oven proper, by placing the heating unit in close proximity to the space to be heated have resulted in local over-heating and consequent burning of the goods placed in those parts of the oven.

The primary object of the invention is to provide an oven having a high volumetric efficiency and a novel construction of the lower portion of the oven whereby the thermal efficiency of the oven may be greatly increased without the undesirable effects of local over-heating.

A further object of the invention is to provide an oven for an electric range in which the heating units will be easily accessible for purposes of replacement or repair.

Still another object of the invention is to provide an oven structure for an electric range whose thermal efficiency will be increased by an induced circulation of heated air.

A general object of the invention is to provide an oven and heater assembly which shall be economical of production, which is capable of being readily assembled and disassembled for purposes of repair, which presents a neat appearance, and which may be easily kept clean.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Figure 1:
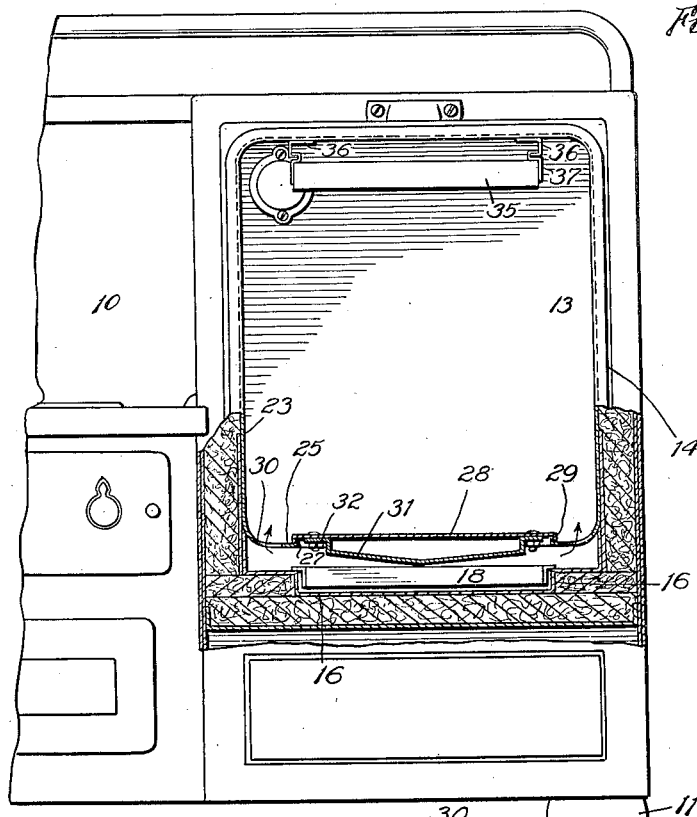
Figure 1 is a fragmentary front elevation partly in section of an electric range having an oven embodying the preferred form of the invention.

The invention, in the form chosen for purposes of disclosure, is incorporated in a range 10 having legs 11, but one of which is shown herein. The oven section, generally designated by the numeral 13 has the usual top, bottom, side and rear walls respectively of a suitable insulated construction. The oven front has an opening 14 adapted to be closed by a door of any desired type such as 15.

To provide increased volumetric efficiency of the oven, the bottom wall thereof is constructed to provide a recess 16 adapted to receive a heating unit 18 of any preferred character, such as that disclosed in my copending application Serial No. 326,562, filed December 17, 1928. The unit may be supported slightly elevated from the bottom of the recess as by means of angle irons 19.

The rear wall of the oven is cut away and fitted with a rectangular casing 20 for an electric socket 21 adapted to receive the terminal contacts 22 of the heating unit 18.

Within the oven section is an inner lining member 23 preferably of sheet metal and shaped to conform generally with the interior of the oven. Its bottom plate 25 is disposed immediately above the heating unit 18 and forms a support for utensils, which is substantially in the plane of the lower edge of the door opening 14.

In order to render the heating unit 18 available for replacement or repair the bottom plate has a central opening 26 of somewhat greater dimensions than those of the heating unit 18 so that the latter member may be lifted bodily therethrough and removed through the oven door. The periphery of the opening 26 is flanged upwardly as at 27 to render the necessary degree of rigidity to the bottom plate and to retain in position a removable cover plate 28 for the opening 26, the cover plate having a downturned peripheral flange 29 which cooperates with the flange 27.

It will be apparent that upon removing the cover plate 28, the heating unit may be easily withdrawn from the oven for purposes of cleaning, and the space below the bottom plate will, at the same time, be rendered accessible. Also it will be seen that the heating unit consumes only a very small amount of space in the oven section.

Figures 2, 4:
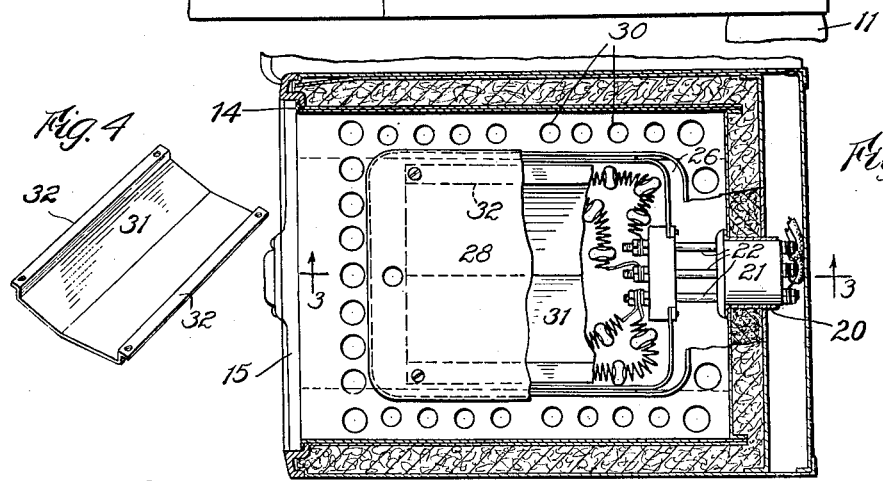
Fig. 2 is a plan view of the inner bottom member of the oven broken away in part to show the lower heating element.
Fig. 4 is a perspective view of a preferred form of heat deflecting plate forming a part of the removable inner bottom of the structure.
Figure 3:
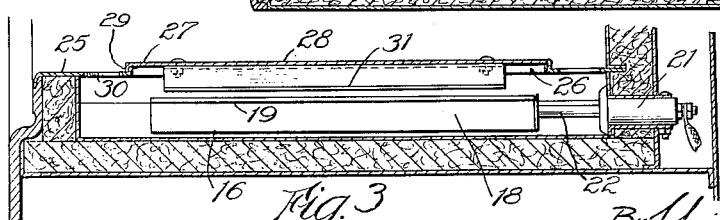
Fig. 3 is a vertical sectional view taken along the line 3—3 of Fig. 2 and illustrating the arrangement of the lower heating unit with respect to the bottom of the oven.

Heat emanating from the unit 18 passes through a rectangular series of apertures 30 formed in the bottom plate adjacent the sides of the oven compartment, the heat being deflected laterally by a spreader disposed immediately above the heating unit. In the present disclosure this spreader or deflector comprises a plate 31 (Fig. 4) of broad V-shaped cross section and is provided with flanges 32 bolted to the underside of the removable cover plate 28. The deflector serves the additional function of preventing the radiant energy from the heating unit 18 from impinging directly upon the bottom plate 28 of the oven compartment.

An upper heating unit 35 may be provided, if desired, and any suitable means may be employed to secure it in position such, for example, as angle members 36 and 37.

In service, the oven may be used with or without the removable cover plate 28, depending upon the character of the cooking operation to be performed. When a rapid and intense heat is required, as for example in broiling, the plate 28, with the attached deflector 31, may be readily removed to expose the contents of the oven to the direct action of the heating unit. On the other hand, for general cooking or baking requirements heated convection currents, rising through the apertures 30, subject the utensils and their contents to a moving and uniform flow of heat.

I claim as my invention:

1. An electric range comprising an oven section having a bottom wall, a plate spaced a short distance above said bottom wall and forming the bottom of an oven compartment, an electric heating unit disposed in the space between the bottom wall and said plate, said plate having an opening therein through which the heating unit may be inserted and removed, a removable cover plate for said opening, said bottom plate having apertures therein adjacent the edges of said opening, and means positioned to prevent the radiant heat from striking the plate forming the bottom of the oven compartment.

2. An electric range comprising an oven section having a bottom wall, an electric heating unit, said bottom wall having a recess therein adapted to receive said heating unit, and means dividing the oven section into an upper oven compartment and an underlying heating space, said means including apertured flanges projecting inwardly from the walls of the oven, defining an opening directly overlying the heating unit, and a unit cover plate and deflector for said opening.

3. An electrical range comprising an oven section having a recessed bottom wall, a plate spaced a short distance above said bottom wall and forming the bottom of the baking compartment, said plate having an opening therein larger than said recess in the bottom wall, a removable cover plate for said opening, an electric heating unit disposed in said recess in the bottom wall and flanges on said heating unit adapted to support said unit by engagement with the upper surface of the bottom wall thereby permitting unincumbered removal of said heating unit through said opening.

In testimony whereof, I have hereunto affixed my signature.

GEORGE E. PICKUP.